(12) United States Patent
Moon et al.

(10) Patent No.: US 9,917,627 B2
(45) Date of Patent: *Mar. 13, 2018

(54) BASE STATION DEVICE IN MOBILE COMMUNICATION SYSTEM AND CIRCULATOR ARRANGEMENT TO INCREASE ISOLATION BETWEEN CO-LOCATED ANTENNAS

(71) Applicant: KMW INC., Hwaseong, Gyeonggi-do (KR)

(72) Inventors: Young-Chan Moon, Gyeonggi-do (KR); Nam-Shin Park, Gyeonggi-do (KR); Chang-Seob Choi, Gyeonggi-do (KR); In-Ho Na, Gyeonggi-do (KR)

(73) Assignee: KMW INC., Hwaseong, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/477,716

(22) Filed: Apr. 3, 2017

(65) Prior Publication Data

US 2017/0207836 A1    Jul. 20, 2017

Related U.S. Application Data

(63) Continuation of application No. PCT/KR2014/009309, filed on Oct. 2, 2014.

(51) Int. Cl.
*H04B 7/024* (2017.01)
*H04B 7/06* (2006.01)
(Continued)

(52) U.S. Cl.
CPC .............. *H04B 7/06* (2013.01); *H04B 1/0035* (2013.01); *H04B 7/024* (2013.01); *H04B 7/026* (2013.01);
(Continued)

(58) Field of Classification Search
None
See application file for complete search history.

(56) References Cited

U.S. PATENT DOCUMENTS

| 2005/0164647 | A1* | 7/2005 | Shamsaifar | H04B 1/005 455/77 |
| 2013/0162495 | A1* | 6/2013 | Kwon | H01Q 21/28 343/852 |

FOREIGN PATENT DOCUMENTS

| EP | 1469548 B1 | 11/2008 |
| KR | 10-2013-0013713 A | 2/2013 |

(Continued)

*Primary Examiner* — Alejandro Rivero
(74) *Attorney, Agent, or Firm* — Mintz Levin Cohn Ferris Glovsky and Popeo, P.C.; Kongsik Kim; Colleen H. Witherell

(57) ABSTRACT

A base station apparatus of mobile communication system is provided, including an antenna system including first antenna for transceiving signals for a first path among MIMO paths, and a second antenna for transceiving signals for a second path among the MIMO paths, a first duplexer including transmission filter for processing the transmitted signal of first path and reception filter for processing the received signal of second path, a second duplexer including reception filter for processing the received signal of first path and transmission filter for processing the transmitted signal of second path, and a path change unit for providing the transmitted signal provided from the first duplexer to the first antenna and the received signal provided from the first antenna to the second duplexer and to provide the transmitted signal from the second duplexer to the second antenna and the received signal from the second antenna to the first duplexer.

8 Claims, 6 Drawing Sheets

(51) Int. Cl.
  *H04B 7/155* (2006.01)
  *H04L 27/233* (2006.01)
  *H04B 7/026* (2017.01)
  *H04B 7/0413* (2017.01)
  *H04B 1/00* (2006.01)

(52) U.S. Cl.
  CPC ........... *H04B 7/0413* (2013.01); *H04B 7/155* (2013.01); *H04L 27/2334* (2013.01)

(56) References Cited

FOREIGN PATENT DOCUMENTS

| | | |
|---|---|---|
| KR | 10-2013-0074585 A | 7/2013 |
| KR | 10-2014-0077400 A | 6/2014 |
| KR | 10-1444661 B1 | 9/2014 |

\* cited by examiner

PRIOR ART

BASE STATION DEVICE IN MOBILE COMMUNICATION SYSTEM AND CIRCULATOR ARRANGEMENT TO INCREASE ISOLATION BETWEEN CO-LOCATED ANTENNAS

CROSS REFERENCE TO RELATED APPLICATIONS

This application is a continuation of International Application No. PCT/KR2014/009309 filed on Oct. 2, 2014, the entire disclosure of which is incorporated herein by reference.

TECHNICAL FIELD

The present disclosure, in some embodiments, relates to a base station including a repeater for a mobile communication (PCS, Cellular, CDMA, GSM, LTE, etc.) system. More particularly, the present disclosure relates to a base station device in a mobile communication system for providing enhanced isolation between a transmitted signal and a received signal which are processed using a Multiple Input Multiple Output (MIMO) scheme.

BACKGROUND

An antenna used in a base station including a repeater for a wireless communication system can have various forms and structures. Recently, a dual polarization antenna structure of 2T2R (2Tx/2Rx) MIMO scheme has been widely employed in wireless communication antennas by applying a polarization diversity scheme. In this case, the signals of the respective transmission & reception paths generally employ a structure for isolating transmitted and received signals using duplexers.

FIG. 1 is a schematic block diagram of a prior art base station apparatus of a mobile communication system. FIG. 1 shows an antenna system 10 having a 2T2R MIMO structure used in a typical mobile communication base station, and first and second duplexers 20 and 21 provided to each transmission & reception path. The antenna system 10 includes a first antenna (Ant0) 100 for transmitting and receiving signals for a first path P0 and a second antenna (Ant1) 101 for transmitting and receiving signals for a second path P1 in a 2T2R structure. The first and second antennas 100 and 101 are arranged to generate polarized waves orthogonal to each other.

In addition, first and second duplexers 20 and 21 respectively connected to the first and second antennas 100 and 101 of the antenna system 10 to separate or combine the transmitted and received signals of the first and second paths P0 and P1 are provided. The first duplexer 20 is connected to a first transmission & reception unit (P0 transmission & reception unit) 30, and the second duplexer 21 is connected to a second transmission & reception unit (P1 transmission & reception unit) 31. The first transmission & reception unit 30 processes signals transmitted and received on the first path, and the second transmission & reception unit 31 processes signals transmitted and received on the second path PI.

The first duplexer 20 has a structure in which a transmission filter (Tx0) 204 and a reception filter (Rx0) 206, which process a transmitted signal and a received signal for the first path P0, respectively, are connected using a T-junction 202. The second duplexer 21 has a structure in which a transmission filter (Tx1) 214 and a reception filter (Rx1) 216, which process a transmitted signal and a received signal for the second path P1, are connected using a T-junction 212.

Here, isolation between the transmitted signal and the received signal on the first path P0 is determined by the first duplexer 20 including the transmission filter 204 and the reception filter 206 connected by the T-junction 202. That is, isolation between the transmitting terminal and the receiving terminal of the first duplexer 20 is the transmission and reception isolation on the first path P0. Similarly, isolation of the transmitted signal and the received signal on the second path P1 corresponds to the isolation produced in implementing the second duplexer 21 including the transmission filter 214 and the reception filter 216 connected by the T-junction 212.

Therefore, as a method to increase isolation between the transmitted signal and the received signal, only improving filtering characteristics (for example, skirt characteristic) in the first and second duplexers 20 and 21 is substantially considered. In general, a technique of increasing the number of stages of each of the transmission filter and the reception filter or increasing the number of notches at a frequency to be isolated is generally employed. However, such a solution has problems of increasing the size of filters and difficulty in manufacture and production of filters.

Further, in order to meet the demand for faster processing and improved quality in the mobile communication market, each base station is being evolved into a small (or micro) cell, and an antenna system and base station equipment are being developed in an integrated manner. Accordingly, there is growing demand for a more compact and lightweight duplexer including the transmission filter and the reception filter described above. It has been a very difficult challenge to increase isolation between the transmitted signal and the received signal in consideration of the size and weight of the duplexer as described above.

Therefore, the present disclosure has been made in an effort to effectively resolve the aforementioned problems, and it is an object of the present disclosure to provide a device configured to increase isolation between the transmitted signal and received signal on a transmission & reception path or maintaining or satisfying a certain required level of isolation while reducing the size and weight of a duplexer configured to process the transmitted and received signals.

SUMMARY

In accordance with some embodiments of the present disclosure, a base station apparatus of a mobile communication system includes an antenna system, a first duplexer, a second duplexer and a path change unit. The antenna system includes a first antenna configured to transmit and receive a signal for a first path among Multiple Input Multiple Output (MIMO) paths, and a second antenna configured to transmit and receive a signal for a second path among the MIMO paths. The first duplexer includes a transmission filter configured to process the transmitted signal of the first path and a reception filter configured to process the received signal of the second path. The second duplexer includes a reception filter configured to process the received signal of the first path and a transmission filter configured to process the transmitted signal of the second path. And the path change unit is configured to deliver the transmitted signal provided by the first duplexer to the first antenna, to deliver the received signal provided by the first antenna to the second duplexer, to deliver the transmitted signal provided by the second duplexer to the second antenna, and to deliver the received signal provided by the second antenna to the first duplexer.

In accordance with some embodiments of the present disclosure, a base station apparatus of a mobile communication system includes an antenna system, a duplexer, a reception filter and a path change unit. The antenna system includes a first antenna configured to transmit and receive a signal for a first path among Multiple Input Multiple Output (MIMO) paths, and a second antenna configured to transmit and receive a signal for a second path among the MIMO paths. The duplexer includes a transmission filter configured to process the transmitted signal of the first path and a reception filter configured to process the received signal of the second path. The reception filter is configured to process the received signal of the first path. And the path change unit is configured to deliver the transmitted signal provided by the duplexer to the first antenna, to deliver the received signal provided by the first antenna to the reception filter, and to deliver the received signal provided by the second antenna to the duplexer.

According to the present disclosure as described above, an apparatus for providing isolation between a transmitted signal and a received signal according to the present disclosure may obtain not only isolation in a duplexer for processing the transmitted and received signals but also additional isolation between the transmitted and received signals ranging from 30 dB to 50 dB.

Since the conventional duplexer for processing transmitted and received signals depends on the isolation characteristics of the filter structure itself, it requires a relatively large number (more than one) of resonators and notch structures to obtain a desired isolation. On the other hand, in the present disclosure, when an additional isolation of 30 dB to 50 dB is obtained, a desired isolation may be obtained with a relatively small number of resonators under the same conditions, and the number of notch structures may be reduced, which makes it possible to implement smaller and lighter filters and duplexers while satisfying desired high performance.

DETAILED DESCRIPTION

Figure 1:
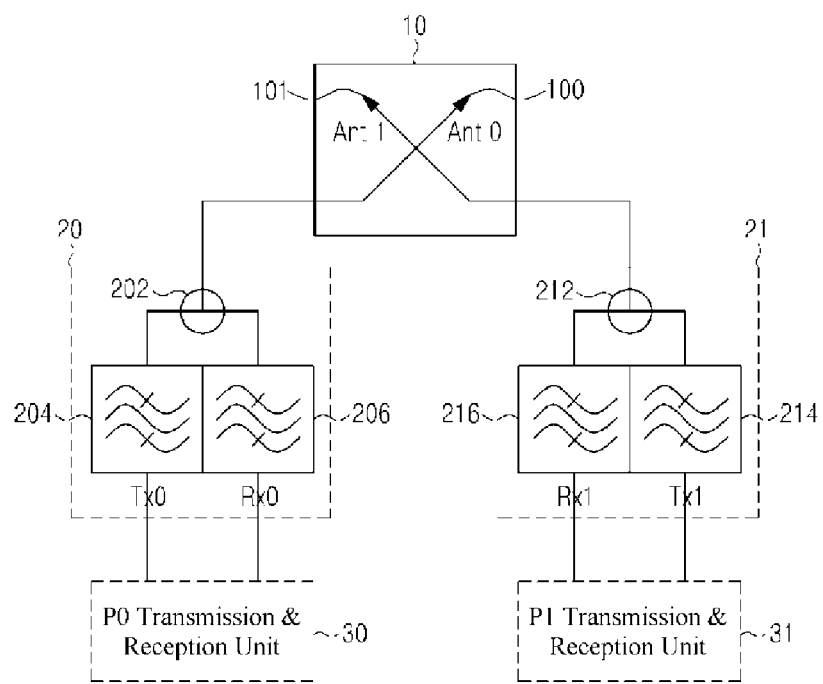
FIG. 1 is a schematic block diagram of a prior art base station apparatus of a mobile communication system.

Hereinafter, at least one embodiment of the present disclosure will be described in detail with reference to the accompanying drawings. In the following description, specific details such as specific components are disclosed, which are provided only for a better understanding of the present disclosure. It will be apparent to those skilled in the art that various modifications and variations can be made in the present disclosure without departing from the spirit or scope of the disclosure. In the following description, like reference numerals designate like elements, although the elements are shown in different drawings.

Figure 2:
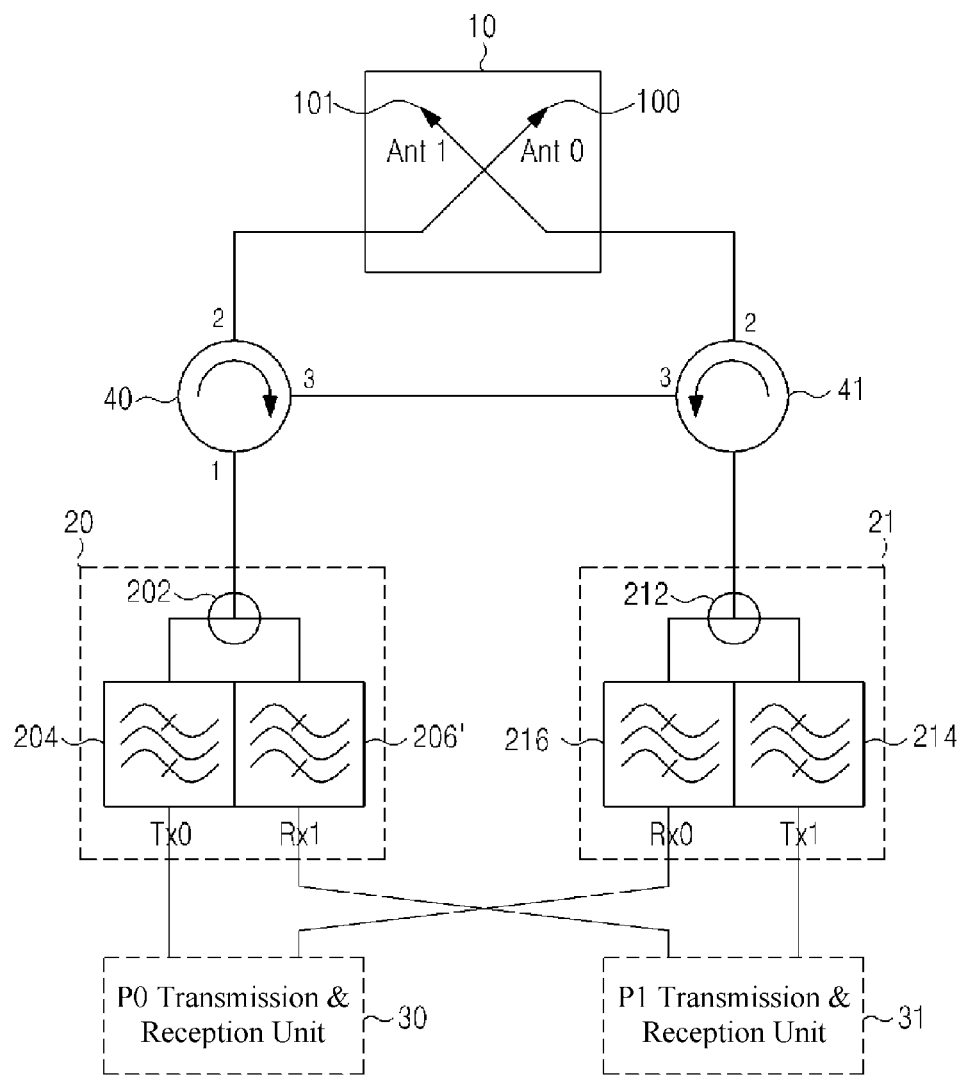
FIG. 2 is a schematic block diagram of a base station apparatus of a mobile communication system, according to a first embodiment of the present disclosure.

FIG. 2 is a schematic block diagram of a base station apparatus of a mobile communication system, according to a first embodiment of the present disclosure. Similar to the prior art example shown in FIG. 1, FIG. 2 shows an antenna system 10 of a 2T2R MIMO structure used in a typical mobile communication base station and first and second duplexers 20 and 21 provided in respective transmission & reception paths thereof. The antenna system 10 includes a first antenna (Ant0) 100 configured to transmit and receive signals for a first path P0 and a second antenna (Ant1) 101 configured to transmit and receive for a second path P1 in a 2T2R structure. The first and second antennas 100 and 101 are arranged to generate polarized waves orthogonal to each other.

In this configuration, in accordance with an aspect of the present disclosure, a path change unit is provided between the first and second duplexers 20 and 21. The path change unit changes the first and second transmission & received signal paths to provide a transmitted signal from the first duplexer 20 to the first antenna 100 and a received signal from the first antenna 100 to the second duplexer 21 and to provide a transmitted signal from the second duplexer 21 to the second antenna 101 and a received signal from the second antenna 101 to the first duplexer 20. A pair of a first circulator 40 and a second circulator 41 may be configured.

More specifically, the first circulator 40 is connected to the first duplexer 20 through terminal 1, terminal 2 is connected to the first antenna 100, and terminal 3 is connected to terminal 3 of the second circulator 41. A signal input through terminal 1 is output through terminal 2, a signal input through terminal 2 is output through terminal 3, and a signal input through terminal 3 is output through terminal 1.

The second circulator 41 is connected to the second duplexer 21 through terminal 1, terminal 2 is connected to the second antenna 101, and terminal 3 is connected to terminal 3 of the first circulator 40. A signal input through terminal 1 is output through terminal 2, a signal input through terminal 2 is output through terminal 3, and a signal input through terminal 3 is output through terminal 1.

Similar to the prior art, the first and second duplexers 20 and 21 are connected to the first and second antennas 100 and 101 of the antenna system 10, respectively, to separate or combine the transmitted and received signals of the first and second paths P0 and P1. In contrast with the prior art, the first duplexer 20 includes not only a transmission filter 204 configured to process a transmitted signal of the first transmission & reception unit (P0 transmission & reception unit) 30, but also a reception filter 206' configured to process a received signal of the second transmission & reception unit (P1 transmission & reception unit) 31. In other words, since the frequency bands of the transmitted and received signals of the first and second paths are the same, the hardware structure of the first duplexer 20 may be substantially the same as that of the conventional structure shown in FIG. 1. However, the reception filter 206' is connected to the second transmission & reception unit 31 and is used to filter the received signal of the second path.

Similarly, the second duplexer 21 includes a transmission filter 214 configured to process a transmitted signal of the second transmission & reception unit (P1 transmission & reception unit) 31 and a reception filter 216' configured to process a received signal of the first transmission & reception unit 30. That is, the reception filter 216' is connected to the first transmission & reception unit 30 and the second duplexer 21 is used to filter the received signal of the first path.

The first duplexer 20 has a structure in which the transmission filter 204 configured to process a transmitted signal for the first path and the reception filter 206' configured to process a received signal for the second path are connected using a T-junction 202, and the second duplexer 21 has a structure in which the transmission filter 214 configured to process a transmitted signal for the second path and the reception filter 216' configured to process a received signal for the first path are connected using a T-junction 212.

According to the structure described above, a signal transmitted from the transmission filter 204 of the first path of the first duplexer 20 is provided to the first antenna 100 of the antenna system 10 via the first circulator 40 and is radiated to the air. A received signal of the first path in the air is received through the first antenna 100 and provided to the second circulator 41 via the first circulator 40. Then, the received signal is provided to the reception filter 216' of the first path of the second duplexer 21. The transmitted signal and the received signal of the first path are separated by the first duplexer 20 and the second duplexer 21 and are thus perfectly isolated from each other.

Similarly, a signal transmitted from the transmission filter 214 of the second path of the second duplexer 21 is provided to the second antenna 101 of the antenna system 10 via the second circulator 41, and is then radiated to the air. A received signal of the second path in the air is received through the second antenna 101, provided to the second circulator 41, and then provided to the first circulator 40 from the second circulator 41. Thereafter, the received signal is provided to the reception filter 206' of the first path of the first duplexer 20. The transmitted signal and the received signal of the second path are separated by the first duplexer 20 and the second duplexer 21 and are thus perfectly isolated from each other.

It can be seen from the structure shown in FIG. 2 that the apparatus according to the present disclosure structurally increases isolation between the transmitting terminal and the receiving terminal in a 2T2R (or higher) MIMO base station using the directionality of the circulators 40 and 41.

More specifically, in one antenna system 10, the first and second antennas 100 and 101 are arranged such that the antennas are orthogonal to each other. When a signal is transmitted and received through the air, the transmitted and received signals between the antennas 100 and 101 typically have an isolation of about 30 dB due to orthogonality between the antennas 100 and 101.

For example, since the reception filter 206' of the second path is bound to the transmission filter 204 of the first path by the T-junction 212, isolation is determined by the isolation characteristics of the transmission filter 204 of the first path. Since the transmission filter 204 of the first path and the reception filter 206' of the second path are connected to the first antenna 100 and the second antenna 101, respectively, an isolation of about 30 dB is given by orthogonality between the antennas 100 and 101. Accordingly, the transmitted signal of the first path and the received signal of the second path obtain isolation of the antennas 100 and 101 in addition to isolation of the transmission & reception filters 204 and 206'. Similarly, the transmitted signal of the second path and the received signal of the first path obtain isolation of the antennas 100 and 101 in addition to isolation of the transmission & reception filters 214 and 216'.

As described above, in the present disclosure, isolation between the transmitted signal and the received signal obtains not only inherent isolation of the duplexers but also additional isolation of about 30 dB between the transmitted and received signals, which is obtained by orthogonality of the antennas. Accordingly, when the isolation required between the transmitted signal and the received signal is, for example, 90 dB, the duplexers of the present disclosure only need to satisfy isolation of about 60 dB. In contrast, in the prior art, since the isolation of 90 dB should be satisfied using only the duplexers, there is a greater difficulty in terms of structure and size in implementing the duplexers.

Figure 3:
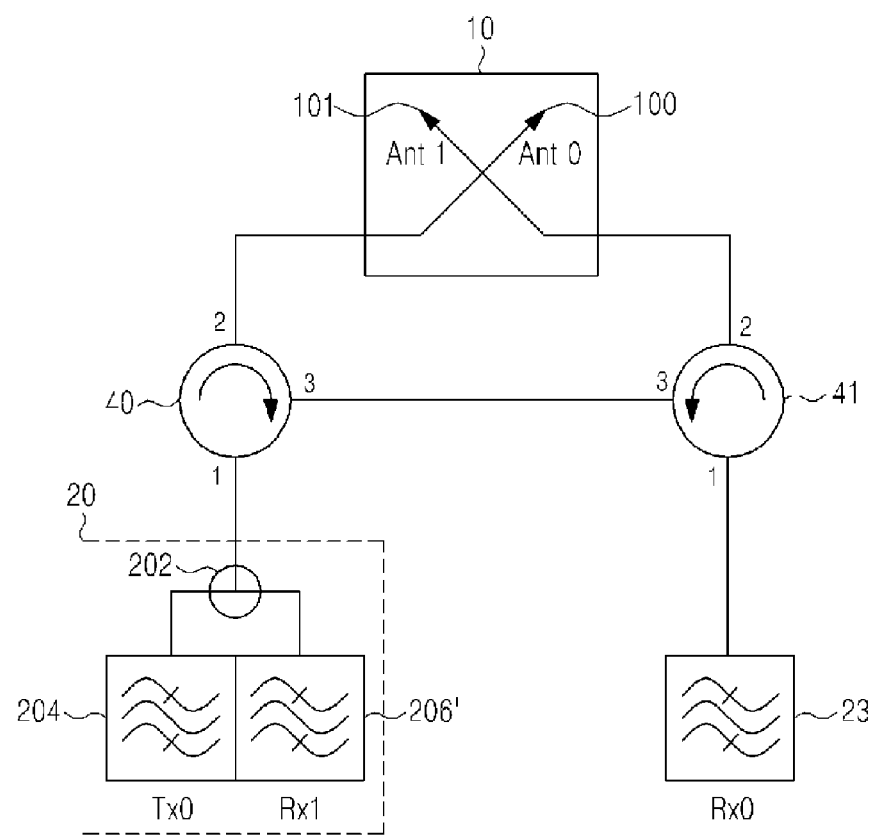
FIG. 3 is a schematic block diagram of a base station apparatus of a mobile communication system, according to a second embodiment of the present disclosure.

FIG. 3 is a schematic block diagram of a base station apparatus of a mobile communication system, according to a second embodiment of the present disclosure. The structure according to the second embodiment shown in FIG. 3 is almost the same as the structure according to the first embodiment shown in FIG. 2 except that instead of the second duplexer 21, the reception filter 23 of the first path is connected to terminal 1 of the second circulator 41. The configuration and operation of the structure shown in FIG. 3 are the same as those of the structure according to the first embodiment shown in FIG. 2 except that the structure shown in FIG. 3 does not have a configuration and operation related to the processing of the transmitted signal of the second path. That is, while the structure of the first embodiment shown in FIG. 2 is employed to implement the 2T2R MIMO scheme, the structure shown in FIG. 3 is intended to implement the 1T2R MIMO scheme.

Figure 4:
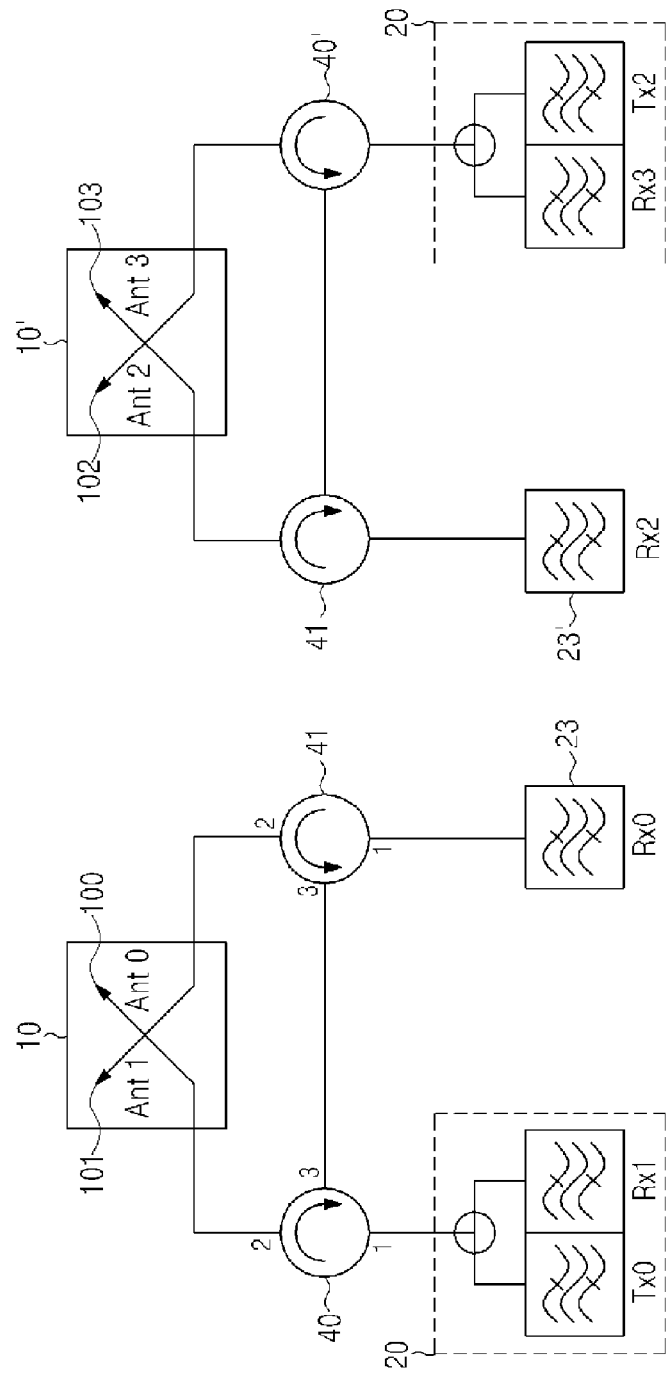
FIG. 4 is a schematic block diagram of a base station apparatus of a mobile communication system, according to a third embodiment of the present disclosure.

FIG. 4 is a schematic block diagram of a base station apparatus of a mobile communication system, according to a third embodiment of the present disclosure. The structure according to the third embodiment shown in FIG. 4 substantially employs two of the structure of the second embodiment shown in FIG. 3. That is, the structure shown in FIG. 4 is provided to implement a 2T4R MIMO scheme by doubling the 1T2R MIMO scheme shown in FIG. 3.

Figure 5A:
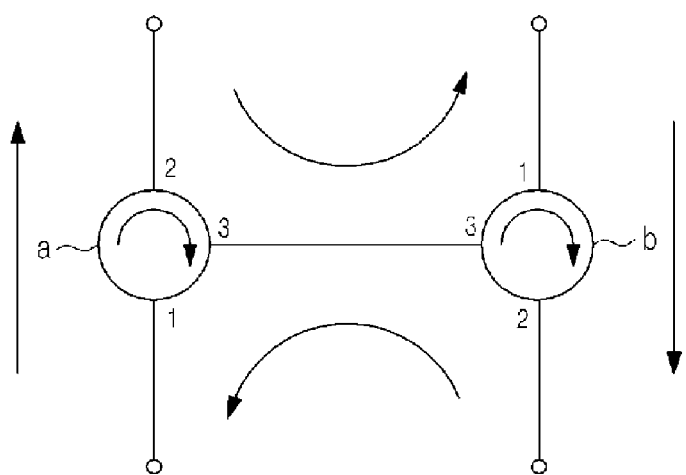
FIGS. 5A and 5B are diagrams of modified embodiments of the present disclosure.
Figure 5B:
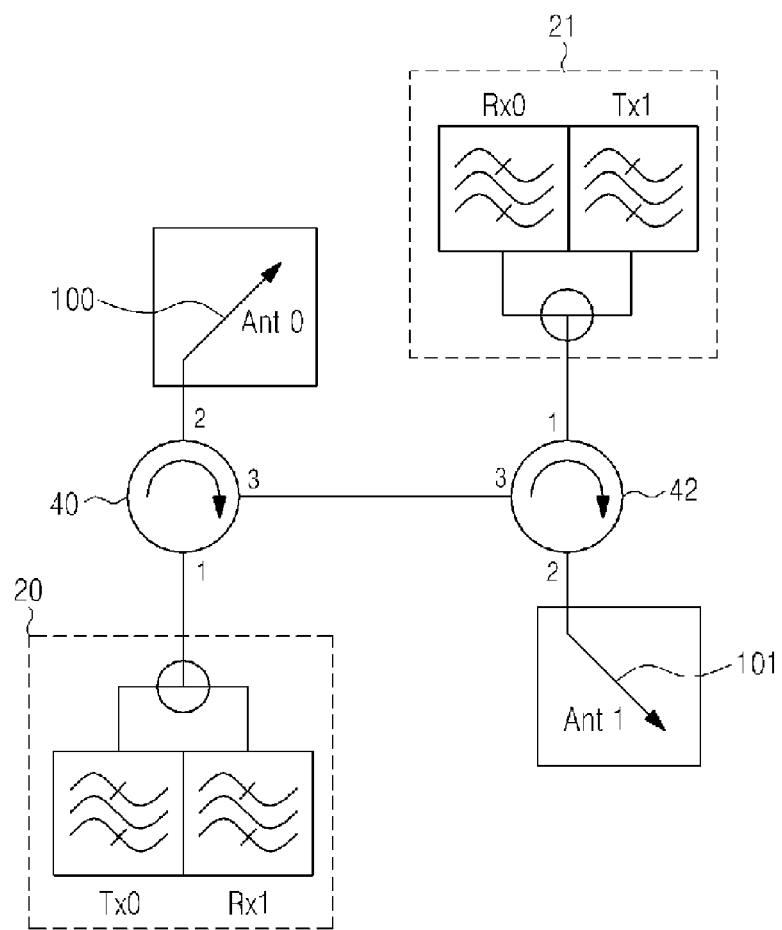

FIGS. 5A and 5B are diagrams of modified embodiments of the present disclosure. For example, in the first embodiment shown in FIG. 2, the directionality of the first circulator 40 is the forward direction (clockwise direction) and the directionality of the second circulator 41 is the reverse direction (counterclockwise direction). In actually implementing a product, it is possible to implement a combination of two forward circulators.

As shown in FIG. 5A, a combined pair of forward circulators (a, b) has a nonreciprocal circuit topology with four signal cyclic transfer terminals. In this structure, a first duplexer 20, a first antenna 100, a second duplexer 21, and a second antenna 101 are connected to respective terminals of the forward-circulator pair 40, 42 shown in FIG. 5B. Thereby, a structure logically identical to the structure of the first embodiment shown in FIG. 2 may be implemented.

An apparatus for providing isolation between the transmitted signal and the received signal according to an embodiment of the present disclosure can be configured as described above. While the present disclosure has been particularly shown and described with reference to exemplary embodiments thereof, it is to be understood that various modifications may be made without departing from the scope of the present invention.

For example, two antennas have been described above as being provided in the antenna system 10 to generate polarized waves orthogonal to each other to obtain isolation, isolation may be secured by arranging the two antennas not orthogonal to each other but spatially spaced apart from each other by an appropriate distance.

While a structure corresponding to the 2T2R MIMO scheme is disclosed in the first embodiment shown in FIG.

2, this structure may be doubled (or n-tuple) to implement a 4T4R (or higher) MIMO scheme.

While the structure of the duplexers is illustrated as being implemented using a T-junction structure in the second and third embodiments shown in FIGS. 3 and 4, the structure of the duplexers may employ a structure using the circulator shown in FIG. 3.

It will be apparent to those skilled in the art that various modifications and variations can be made in the present disclosure. Accordingly, one of ordinary skill would understand the scope of the claimed invention is not to be limited by the explicitly described above embodiments but by the claims and equivalents thereof.

The invention claimed is:

1. A base station apparatus of a mobile communication system, the base station apparatus comprising:
    an antenna system comprising a first antenna configured to transmit and receive a signal for a first path among Multiple Input Multiple Output (MIMO) paths, and a second antenna configured to transmit and receive a signal for a second path among the MIMO paths;
    a first duplexer comprising a transmission filter configured to process a transmitted signal of the first path and a reception filter configured to process a received signal of the second path;
    a second duplexer comprising a reception filter configured to process a received signal of the first path and a transmission filter configured to process a transmitted signal of the second path; and
    a path change unit configured to
        deliver the transmitted signal provided by the first duplexer to the first antenna,
        deliver a received signal provided by the first antenna to the second duplexer,
        deliver the transmitted signal provided by the second duplexer to the second antenna, and
        deliver a received signal provided by the second antenna to the first duplexer,
    wherein the path change unit comprises a first circulator and a second circulator,
    wherein the first circulator has first, second and third terminals connected to the first duplexer, the first antenna, and a third terminal of the second circulator, respectively, and a signal inputted through the first terminal of the first circulator is output through the second terminal of the first circulator, a signal inputted through the second terminal of the first circulator is output through the third terminal of the first circulator, and a signal inputted through the third terminal of the first circulator is output through the first terminal of the first circulator, and
    wherein the second circulator has first and second terminals and the third terminal connected to the second duplexer, the second antenna and the third terminal of the first circulator, respectively, and a signal inputted through the first terminal of the second circulator is output through the second terminal of the second circulator, a signal inputted through the second terminal of the second circulator is output through the third terminal of the second circulator, and a signal inputted through the third terminal of the second circulator is output through the first terminal of the second circulator.

2. The base station apparatus according to claim 1, wherein the first duplexer and the second duplexer are each configured to have a T-junction for interconnecting a transmission filter and a reception filter therein.

3. The base station apparatus of claim 1, wherein the first antenna and the second antenna are arranged to generate polarized waves orthogonal to each other.

4. The base station apparatus of claim 2, wherein the first antenna and the second antenna are arranged to generate polarized waves orthogonal to each other.

5. A base station apparatus of a mobile communication system, the base station apparatus comprising:
    an antenna system comprising a first antenna configured to transmit and receive a signal for a first path among Multiple Input Multiple Output (MIMO) paths, and a second antenna configured to transmit and receive a signal for a second path among the MIMO paths;
    a duplexer comprising a transmission filter configured to process a transmitted signal of the first path and a first reception filter configured to process a received signal of the second path;
    a second reception filter configured to process a received signal of the first path; and
    a path change unit configured to
        deliver the transmitted signal provided by the duplexer to the first antenna,
        deliver a received signal provided by the first antenna to the first reception filter, and
        deliver a received signal provided by the second antenna to the duplexer,
    wherein the path change unit comprises a first circulator and a second circulator,
    wherein the first circulator has first, second and third terminals connected to the duplexer, the first antenna, and a third terminal of the second circulator, respectively, and a signal inputted through the first terminal of the first circulator is output through the second terminal of the first circulator, a signal inputted through the second terminal of the first circulator is output through the third terminal of the first circulator, and a signal inputted through the third terminal of the first circulator is output through the first terminal of the first circulator, and
    wherein the second circulator has first and second terminals and the third terminal connected to the reception filter, the second antenna and the third terminal of the first circulator, respectively, and a signal inputted through the first terminal of the second circulator is output through the second terminal of the second circulator, a signal inputted through the second terminal of the second circulator is output through the third terminal of the second circulator, and a signal inputted through the third terminal of the second circulator is output through the first terminal of the second circulator.

6. The base station apparatus of claim 5, wherein the duplexer is configured to have a T-junction for interconnecting the transmission filter and the first reception filter therein.

7. The base station apparatus of claim 5, wherein the first antenna and the second antenna are arranged to generate polarized waves orthogonal to each other.

8. The base station apparatus of claim 6, wherein the first antenna and the second antenna are arranged to generate polarized waves orthogonal to each other.

* * * * *